Feb. 7, 1928. 1,658,464
S. W. RUSHMORE
INTERNAL COMBUSTION ENGINE
Filed Nov. 23, 1927
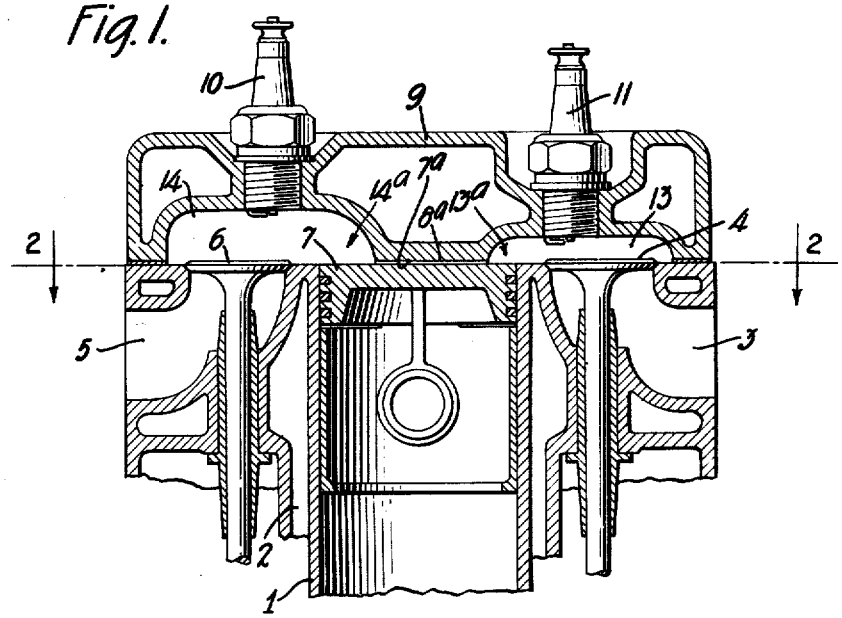
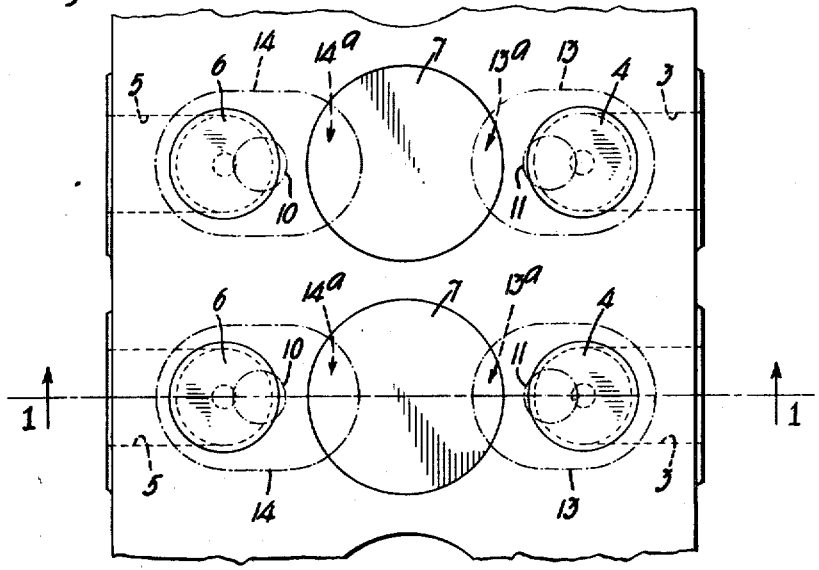
Inventor
Samuel W. Rushmore
By his Attorney
George C. Dean Patented Feb. 7, 1928.

1,658,464

UNITED STATES PATENT OFFICE.

SAMUEL W. RUSHMORE, OF PLAINFIELD, NEW JERSEY.

INTERNAL-COMBUSTION ENGINE.

Application filed November 23, 1927. Serial No. 235,140.

My present invention concerns internal combustion engines of the type wherein high compression is highly desirable for efficiency and economy of fuel consumption, and wherein the nature of the combustible fuel and the conditions of its burning within the engine are such that the desired high compression is substantially limited by reason of tendency of the combustible mixture to detonate instead of burning in an orderly manner.

The theory is that under certain conditions, the initial burning or explosion of part of the mixture starts an explosive wave that piles up excessive instantaneous pressures, particularly in the region of the exhaust valve, which is usually red hot under normal conditions of full load operation, and that under such condition the heat due to compression of the gas and excessive heat from the valve results in the above described violent type of explosion called detonation. The theory that detonation is largely due to piling up pressure is supported by experience which shows that the shorter the distance afforded for travel of flame in the compression space, the higher the compression may be carried, a notable illustration being the case of engines with cylinders of very small diameter, which experience shows can be run with very high compression without danger from detonation.

From the above, it will be evident that while small cylinder engines may now or hereafter be designed so as to develop conditions where detonation becomes a factor setting a limit of high compression so that my present invention would be applicable, nevertheless, it is particularly useful for engines having cylinders of relatively large diameter, wherein detonation already figures as the limiting factor preventing higher compression efficiencies.

A further specifically important application of my invention is to engines of the so-called T-head type, wherein the intake manifold and valves are on one side of the engine and the exhaust manifold and valves on the other side of the engine. While this type of engine is highly desirable because it permits the use of very large valves and for other reasons, it has been found to afford other conditions particularly favorable for detonation and hence least favorable for high compression.

For application of the above and analogous conditions, my present invention contemplates localizing most of the compression space of each cylinder, adjacent the inlet valve, leaving only a small compression space adjacent the exhaust valve, and shaping the head so that these two chambers are virtually separated at the instant of ignition. Moreover, the exit from the cylinder to the exhaust valve may be of substantially reduced cross-section and may even show very substantial resistance to escape of the exhaust. I have discovered that very considerable resistance is of relatively small effect because the major part of scavenging of the cylinder occurs as soon as the exhaust valve opens and releases the highest part of the pressure. The remainder of the scavenging during the exhaust stroke requires relatively low velocity outflow. Consequently, material throttling or resistance of the exhaust outlet will cause only a slight effect upon the brake horse power of the engine, and this is more than compensated for by the effect of such throttling resistance, in keeping the combustible charge away from the hot exhaust valve, thus making it possible to raise the compression to a very high figure without any danger of detonation. I believe I am the first to suggest the practical exclusion of the exhaust valve from the combustible charge by having it more or less completely muffled in burned gases at the moment of ignition.

As detonation is caused and completed only at the instant the piston is at the top of its stroke, no moving parts other than the piston are necessary for thus separating the compression spaces. In the present case, this is accomplished by bringing the cylinder head down to a position of approximate parallelism with the head of the piston over all the central part of the piston head area.

I have determined by actual experiment, that the permissible clearance between the parallel surfaces may be reduced to a very few thousandths of an inch without danger that carbon deposits will cause the piston head to pound the cylinder head. If the carbon were suddenly introduced, the pounding naturally would be severe, but the so-called carbon is initially a soft, gummy deposit, consisting mainly of silica from the road dust with some carbon and oil. The deposit is gradual and, being soft and tarry, is simply squeezed along and ejected before it has time to form a solid. Consequently, any carbon deposits that can form merely serve the useful function of a self gauging sealing between the parallel surfaces. The deposit is therefore a benefit instead of a danger, because thereby the clearance space between the parallel surfaces automatically becomes very thin and it is so extended that flame initiated in the compression space adjacent the inlet valve, will become chilled and incapable of cutting a passage through the carbon to permit passage of a detonating wave over to the exhaust valve passage, even in case the latter should contain an explosive charge.

The above and other features of my invention will be more fully understood from the following description in connection with the accompanying drawings, in which Fig. 1 is a vertical axial section transversely of an internal combustion engine of the T-head type, having my invention embodied therein, the section being on the line 1—1, Fig. 2; and Fig. 2 is a top plan view of the cylinders and valves with the cylinder head removed.

In these drawings, the parts of the engine necessary to an understanding of my present invention are shown as comprising the cylinder, 1, provided with a water-jacket, 2, formed with an intake 5, controlled by intake valve 6, an exhaust 3 controlled by an exhaust valve 4, a piston 7 in the cylinder and, in operative relation to the above parts, a cylinder head 8, provided with a water-jacket 9 and having mounted therein spark plugs 10, 11.

As shown in Fig. 1, the position of the piston 7 on dead center at the upper end of the compression stroke has all the central area of its upper face 7ª closely confronted by a broad lower surface 8ª of the cylinder head 8. The clearance between 7ª and 8ª is reduced to approximately the minimum practically permissible by conditions of ordinary operation. The compression space is afforded mainly by the chamber 14, which is an enlarged inlet valve chamber and may have its discharge outlet 14ª leading into the cylinder, as large and low resistance as may be desired. On the other hand, the exhaust valve chamber 13 is of small volume and affords a small somewhat throttled outlet from the cylinder.

As indicated in dot and dash lines, Fig. 2, the chambers 13 and 14 extend toward each other so as to partially overlap the head of the piston 7. The area of the overlap of each chamber may vary considerably from that shown as may also the volumes of the chambers, but always there is a wide area of parallel, small clearance surfaces between them, when the piston is in the position shown. In the drawing, the largest overlap, that of inlet valve chamber 14, is less than one-third of the diameter and less than one-sixth of the area of the piston head.

It results from the above relation of parts that the two chambers 13, 14, constitute a single compression space in so far as concerns density and degree of compression during the compression stroke, but the explosive mixture goes mainly into 14 and, so far as concerns burning of the charge and particularly as concerns propagation of a detonating wave, the main compression space 14 is effectively separated from the red hot exhaust valve 4, by the piston when at the upper limit of its stroke.

For instance, assuming a compression ratio of, say, 5 to 1, the combustible charge in the intake chamber will be 20 parts exhaust gas and eighty parts fresh mixture, but the exhaust chamber, being an isolated pocket and removed from the stream of incoming charge, will contain nothing but burnt gas until the beginning of the compression stroke and at the end of compression $4/5$ of the space will be $1/5$ exhaust and $1/5$ of the space all exhaust, making approximately thirty-six parts of exhaust gas to sixty-four parts of fresh charge. As there can be very little turbulence in my elongated and restricted exhaust chamber, it is probable that most of the exhaust will be crowded to the farthest end, and there, where the exhaust valve will be the hottest, there will be nothing but exhaust gas. Therefore, even if a thin sheet of flame should enter the exhaust chamber, the combustion could not by any chance approach detonating violence.

Conversely, the gases in 13 are cut off from 14 and the separation is such that a separate spark plug for 13 and 14 may be desirable for causing synchronized sparks in the two chambers to initiate combustion in both parts of the charge, if the proportions and conditions of operations are such that 13 will contain a burnable charge.

By my above described invention, I am enabled to so increase the compression that with the larger valves permitted by the T-type construction, the cost of the desirable T-head design, for a given rated horse power may be considerably lower than that of the cheaper L-head design while there may be also an appreciable saving in weight.

My present invention is closely related to, but is specifically different from, that set forth and more broadly claimed in my prior application Ser. No. 184,878, filed April 19, 1927.

I claim:

1. An internal combustion engine, of the high-compression, T-head type, having a valved inlet passage for intake of an unignited charge located on one side of said head and a valved exhaust outlet chamber located in the opposite side; said engine including also a cylinder, piston and cylinder head arranged to afford a plurality of compression chambers, separated by areas of small clearance which are of great width as compared with said clearance and which extend in a wide zone entirely across and between the cylinder head and the piston when the latter is at the upper end of the compression stroke, one of said compression chambers including the inlet and the other including the exhaust outlet, the chamber that includes the outlet being of large volume to afford most of the compression space, while the one including the exhaust outlet is relatively small.

2. An internal combustion engine, of the high-compression, T-head type, having a valved inlet passage for intake of the unignited charge located on one side of said head and a valved exhaust outlet chamber located in the opposite side; said engine including also a cylinder, piston and cylinder head arranged to afford a plurality of compression chambers, separated by areas of small clearance which are of great width as compared with said clearance and which extend in a wide zone entirely across and between the cylinder head and the piston when the latter is at the upper end of the compression stroke, one of said compression chambers including the inlet and the other including the exhaust outlet, the chamber that includes the outlet being of large volume to afford most of the compression space, while the one including the exhaust outlet is relatively small and has communication with the cylinder space through a relatively small exhaust outlet.

3. An internal combustion engine of the four-cycle, T-head type, including cylinder, piston and cylinder head formed with separate inlet and exhaust valve chambers on opposite sides of the cylinder, but separated from each other by wide areas of small clearance between cylinder head and piston when the latter is at the end of its compression stroke, the inlet chamber affording most of the compression space, while the exhaust chamber is relatively small, in combination with a spark plug in said inlet chamber.

4. An internal combustion engine of the four-cycle, T-head type, including cylinder, piston and cylinder head formed with separate inlet and exhaust valve chambers on opposite sides of the cylinder, but separated from each other by wide areas of small clearance between cylinder head and piston when the latter is at the end of its compression stroke, the inlet chamber affording most of the compression space, while the exhaust chamber is relatively small, in combination with separate spark plugs for each of said chambers.

5. An internal combustion engine, of the high-compression, T-head type, having a valved inlet passage for intake of an unignited charge located on one side of said head and a valved exhaust outlet chamber located in the opposite side; said engine including also a cylinder, piston and cylinder head arranged to afford a plurality of compression chambers, separated by areas of small clearance which are of great width as compared with said clearance and which extend in a wide zone entirely across and between the cylinder head and the piston when the latter is at the upper end of the compression stroke, one of said compression chambers including the inlet and the other including the exhaust outlet, the chamber that includes the outlet being of large volume to afford most of the compression space, while the one including the exhaust outlet is relatively small, and said wide separating zone of minimum clearance including the entire area of the piston head except only opposite zone areas of minor circumferential extent that are necessary for and are swept by the flow of gases between the inlet valve chamber and the cylinder during the intake and compression strokes and from said cylinder to the exhaust valve chamber during the compression and exhaust strokes.

Signed at Plainfield, in the county of Union and State of New Jersey this 22nd day of November, A. D. 1927.

SAMUEL W. RUSHMORE.

also a cylinder, piston and cylinder head arranged to afford a plurality of compression chambers, separated by areas of small clearance which are of great width as compared with said clearance and which extend in a wide zone entirely across and between the cylinder head and the piston when the latter is at the upper end of the compression stroke, one of said compression chambers including the inlet and the other including the exhaust outlet, the chamber that includes the outlet being of large volume to afford most of the compression space, while the one including the exhaust outlet is relatively small.

2. An internal combustion engine, of the high-compression, T-head type, having a valved inlet passage for intake of the unignited charge located on one side of said head and a valved exhaust outlet chamber located in the opposite side; said engine including also a cylinder, piston and cylinder head arranged to afford a plurality of compression chambers, separated by areas of small clearance which are of great width as compared with said clearance and which extend in a wide zone entirely across and between the cylinder head and the piston when the latter is at the upper end of the compression stroke, one of said compression chambers including the inlet and the other including the exhaust outlet, the chamber that includes the outlet being of large volume to afford most of the compression space, while the one including the exhaust outlet is relatively small and has communication with the cylinder space through a relatively small exhaust outlet.

3. An internal combustion engine of the four-cycle, T-head type, including cylinder, piston and cylinder head formed with separate inlet and exhaust valve chambers on opposite sides of the cylinder, but separated from each other by wide areas of small clearance between cylinder head and piston when the latter is at the end of its compression stroke, the inlet chamber affording most of the compression space, while the exhaust chamber is relatively small, in combination with a spark plug in said inlet chamber.

4. An internal combustion engine of the four-cycle, T-head type, including cylinder, piston and cylinder head formed with separate inlet and exhaust valve chambers on opposite sides of the cylinder, but separated from each other by wide areas of small clearance between cylinder head and piston when the latter is at the end of its compression stroke, the inlet chamber affording most of the compression space, while the exhaust chamber is relatively small, in combination with separate spark plugs for each of said chambers.

5. An internal combustion engine, of the high-compression, T-head type, having a valved inlet passage for intake of an unignited charge located on one side of said head and a valved exhaust outlet chamber located in the opposite side; said engine including also a cylinder, piston and cylinder head arranged to afford a plurality of compression chambers, separated by areas of small clearance which are of great width as compared with said clearance and which extend in a wide zone entirely across and between the cylinder head and the piston when the latter is at the upper end of the compression stroke, one of said compression chambers including the inlet and the other including the exhaust outlet, the chamber that includes the outlet being of large volume to afford most of the compression space, while the one including the exhaust outlet is relatively small, and said wide separating zone of minimum clearance including the entire area of the piston head except only opposite zone areas of minor circumferential extent that are necessary for and are swept by the flow of gases between the inlet valve chamber and the cylinder during the intake and compression strokes and from said cylinder to the exhaust valve chamber during the compression and exhaust strokes.

Signed at Plainfield, in the county of Union and State of New Jersey this 22nd day of November, A. D. 1927.

SAMUEL W. RUSHMORE.

CERTIFICATE OF CORRECTION.

Patent No. 1,658,464.      Granted February 7, 1928, to

SAMUEL W. RUSHMORE.

It is hereby certified that error appears in the printed specification of the above numbered patent requiring correction as follows: Page 3, line 12, claim 1, line 33, claim 2, and line 82, claim 5, for the word "outlet" read "inlet"; and that the said Letters Patent should be read with this correction therein that the same may conform to the record of the case in the Patent Office.

Signed and sealed this 6th day of March, A. D. 1928.

Seal

M. J. Moore,
Acting Commissioner of Patents.

CERTIFICATE OF CORRECTION.

Patent No. 1,658,464.  Granted February 7, 1928, to

SAMUEL W. RUSHMORE.

It is hereby certified that error appears in the printed specification of the above numbered patent requiring correction as follows: Page 3, line 12, claim 1, line 33, claim 2, and line 82, claim 5, for the word "outlet" read "inlet"; and that the said Letters Patent should be read with this correction therein that the same may conform to the record of the case in the Patent Office.

Signed and sealed this 6th day of March, A. D. 1928.

Seal

M. J. Moore,
Acting Commissioner of Patents.